United States Patent [19]

Kumar et al.

[11] Patent Number: 5,980,611
[45] Date of Patent: Nov. 9, 1999

[54] AIR PURIFICATION PROCESS

[75] Inventors: Ravi Kumar, Allentown, Pa.; Shuguang Deng, Stirling, N.J.; Martin Bülow, Basking Ridge, N.J.; Frank Fitch, Bedminster, N.J.; Adeola Florence Ojo, Chatham, N.J.; Craig S. Gittleman, North Plainfield, N.J.

[73] Assignee: The BOC Group, Inc., Murray Hill, N.J.

[21] Appl. No.: 08/937,713

[22] Filed: Sep. 25, 1997

[51] Int. Cl.⁶ .................................................. B01D 53/047
[52] U.S. Cl. ................................ 95/101; 95/102; 95/105; 95/117; 95/139
[58] Field of Search ..................... 95/96, 98, 100–105, 95/117, 122, 139

[56] References Cited

U.S. PATENT DOCUMENTS

| | | | |
|---|---|---|---|
| 3,078,638 | 2/1963 | Milton | 95/139 |
| 3,078,639 | 2/1963 | Milton | 95/139 |
| 3,266,221 | 8/1966 | Avery | 95/139 X |
| 3,355,860 | 12/1967 | Arnoldi | 95/139 X |
| 3,751,878 | 8/1973 | Collins | 95/139 X |
| 3,808,773 | 5/1974 | Reyhing et al. | 95/139 X |
| 3,885,927 | 5/1975 | Sherman et al. | 95/139 |
| 4,077,779 | 3/1978 | Sircar et al. | 95/139 X |
| 4,249,915 | 2/1981 | Sircar et al. | 95/139 X |
| 4,477,264 | 10/1984 | Kratz et al. | 95/139 X |
| 4,529,416 | 7/1985 | Sircar et al. | 95/139 X |
| 4,711,645 | 12/1987 | Kumar | 95/139 X |
| 4,775,396 | 10/1988 | Rastelli et al. | 95/139 X |
| 4,857,083 | 8/1989 | DiMartino | 95/139 X |
| 4,986,835 | 1/1991 | Uno et al. | 95/139 X |
| 5,013,334 | 5/1991 | Maurer | 95/139 X |
| 5,156,657 | 10/1992 | Jain et al. | 95/139 X |
| 5,202,096 | 4/1993 | Jain | 95/139 X |
| 5,232,474 | 8/1993 | Jain | 95/139 X |
| 5,395,427 | 3/1995 | Kumar et al. | 95/139 X |
| 5,447,558 | 9/1995 | Acharya | 95/139 X |
| 5,531,808 | 7/1996 | Ojo et al. | 95/139 X |
| 5,560,763 | 10/1996 | Kumar | 95/139 X |
| 5,571,309 | 11/1996 | Kumar | 95/139 X |
| 5,587,003 | 12/1996 | Bülow et al. | 95/139 X |
| 5,656,064 | 8/1997 | Golden et al. | 95/139 X |
| 5,728,198 | 3/1998 | Acharya et al. | 95/139 X |

FOREIGN PATENT DOCUMENTS

| | | | |
|---|---|---|---|
| 59-160533 | 9/1984 | Japan | 95/139 |
| 1068150 | 1/1984 | Russian Federation | 95/139 |

*Primary Examiner*—Robert Spitzer
*Attorney, Agent, or Firm*—Philip H. Von Neida; Salvadore P. Pace

[57] ABSTRACT

Substantially all of the carbon dioxide is removed from a gas containing up to about 1% by volume carbon dioxide by subjecting the gas to a pressure swing adsorption process using as the adsorbent a single layer of zeolite having a silicon to aluminum atomic ratio in the range of 1.5 to 70. The process is particularly suitable for removing substantially all carbon dioxide and water vapor contained in air prior to subjecting the air to cryogenic distillation.

17 Claims, No Drawings

AIR PURIFICATION PROCESS

FIELD OF THE INVENTION

This invention relates to the purification of air, and more particularly to the removal of water vapor and carbon dioxide from air in preparation for its separation by cryogenic distillation. In particular, the invention concerns the production of high purity air by subjecting the air to a pressure swing adsorption (PSA) process using a single layer of zeolite adsorbent.

BACKGROUND OF THE INVENTION

In many industrial processes using a gaseous feed stream it is desirable or necessary to remove carbon dioxide from the gaseous feed stream prior to certain steps of the process. For example, in the separation of atmospheric air into its component parts by cryogenic distillation, it is necessary to prepurify the air by removing carbon dioxide and water vapor from the air feed prior to refrigerating the air; otherwise, these gases would condense and freeze in the refrigeration heat exchange equipment and eventually clog the equipment, thereby necessitating removal of the equipment from service for removal of the frozen carbon dioxide and ice.

The carbon dioxide and water vapor can be removed from gas streams by a number of techniques. One well known method involves the use of pairs of reversing heat exchangers that are operated alternately, such that one heat exchanger is in purification service while the other is undergoing frozen carbon dioxide and ice removal. Specifically, in this method the gas feed is passed through one heat exchanger in exchange with a refrigerant, which causes the carbon dioxide and water vapor to freeze onto the surfaces of the heat exchanger. When the buildup of frozen carbon dioxide and ice in the heat exchanger reaches a certain level, the heat exchanger is taken out of service to remove, by sublimation or melting, the frozen carbon dioxide and ice. The other heat exchanger of the pair, from which frozen carbon dioxide and ice have been removed, is then placed into purification service. This method has the disadvantage that a considerable amount of heat energy is required to sublime or melt the frozen carbon dioxide and ice during regeneration of the heat exchangers.

A popular method of removing carbon dioxide and water vapor from gas streams is adsorption. One common adsorption method of air prepurification is PSA using two serially-connected adsorption layers, the first layer containing a desiccant, such as silica gel or activated alumina for water vapor removal, and the second layer containing a carbon dioxide-selective adsorbent, such as sodium-exchanged type X zeolite (13X zeolite). Typical two layer air prepurification PSA processes are described in U.S. Pat. Nos. 5,110,569 and 5,156,657, the disclosures of which are incorporated herein by reference. This method has a number of disadvantages. It is difficult to desorb carbon dioxide from the 13X zeolite. Also, the layer of zeolite develops "cold spots" in its upstream region, i.e. in the vicinity of the inlet of the zeolite adsorbent, and the process becomes unstable with time.

Temperature swing adsorption (TSA) processes have also been practiced for the removal of carbon dioxide from nonpolar gas streams using the above discussed combination of adsorbent layers. U.S. Pat. No. 5,110,569, mentioned above, shows such a process. TSA processes have also been practiced using a single layer of adsorbent. A major disadvantage of these TSA processes is that a great quantity of heat energy is required in the adsorbent regeneration step, since both layers must be heated sufficiently to drive off the adsorbed moisture and carbon dioxide.

Air prepurification by PSA has also been practiced using a single bed of adsorbent which removes both water vapor and carbon dioxide. Such a process is disclosed in U.S. Pat. No. 5,232,474, which uses a single layer of activated alumina as adsorbent. The principal disadvantages of this method of air prepurification are that it is difficult to produce high purity air by this method, a high volume of purge gas is required to effect adequate adsorbent regeneration and the process becomes unstable over time.

U.S. Pat. No. 4,770,676 discloses the use of various adsorbents, including 5A zeolite, silicalite, mordenite and activated carbon for the bulk separation of carbon dioxide from methane by PSA.

Superior methods of producing high purity air are continuously sought. The present invention provides a method which accomplishes this, and does so with low energy and capital expenditures.

SUMMARY OF THE INVENTION

According to a broad embodiment of the invention, carbon dioxide is adsorbed from a nonpolar gas stream containing up to about 1% by volume carbon dioxide by subjecting the gas stream to a pressure swing adsorption process having an adsorption step and an adsorbent regeneration step, wherein the adsorption step comprises passing the gas stream through an adsorption zone which contains a layer of zeolite having a silicon/aluminum atomic ratio in the range of about 1.5 to about 70, thereby adsorbing substantially all carbon dioxide from said gas stream.

In a preferred embodiment, the zeolite is selected from those having the faujasite, mordenite, chabazite, offretite, erionite, ferrierite, gmelinite, EMT, beta, omega, type A, type L, ZSM-5, ZSM-11, ZSM-12, ZSM-18, ZSM-57, NU-87 structures and combinations of these. In this embodiment, the zeolite preferably has a silicon/aluminum atomic ratio in the range of about 1.6 to about 50.

The invention is particularly suitable for removing carbon dioxide from gas streams containing up to about 1000 ppm carbon dioxide.

In cases where the gas stream additionally contains water vapor, the water vapor is also adsorbed from the gas stream as it passes through the adsorption zone, thereby producing a substantially water vapor-free and carbon dioxide-free gas stream.

The invention is particularly suitable for the removal of carbon dioxide and water vapor from air.

In a preferred embodiment the carbon dioxide is removed from the gas stream by passing the gas stream through a single layer of zeolite.

In another preferred embodiment, the zeolite has as exchangeable cations one or more of hydrogen ions, lithium ions, sodium ions and potassium ions. In a more preferred aspect of this embodiment, the adsorbent is predominantly sodium exchanged zeolite. A most preferred sodium zeolite is sodium Y zeolite, a sodium-exchanged zeolite having a faujasite structure with a silicon/aluminum atomic ratio of 1.5 or greater.

In another preferred embodiment, the zeolite is selected from those having the ZSM-5, ZSM-11, ZSM-12, ferrierite, beta, mordenite, NU-87 structures or combinations of these, particularly selected from those having a silicon/aluminum atomic ratio in the range of about 15 to about 40.

In another preferred embodiment the zeolite is selected from those having the faujasite, type A zeolite, type L zeolite, offretite, erionite, EMT zeolite, chabazite structures and combinations of these, particularly selected from those having a silicon/aluminum atomic ratio in the range of about 1.6 to about 10 and having as exchangeable cations one or more of lithium ions, sodium ions and potassium ions.

In one preferred embodiment the adsorption step of the pressure swing adsorption process is carried out at a temperature in the range of about 0 to about 50° C. It is likewise preferably carried out at a pressure in the range of about 0.9 to about 50 bara. The adsorbent regeneration step of the pressure swing adsorption process is carried out at a pressure less than that used in the adsorption step, and preferably in the range of about 0.1 to about 2 bara. The adsorbent regeneration step is preferably carried out at a temperature in the range of about 0 to about 100° C.

In another preferred embodiment of the invention, the adsorbent is purged with a substantially water vapor- and carbon dioxide-free gas stream during at least part of the adsorbent regeneration step.

The invention is particularly suitable for the purification of air that is subsequently subjected to cryogenic distillation. In this case, the adsorbent is preferably purged during at least part of the adsorbent regeneration step with a portion of the purified air produced in the adsorption process or a waste stream produced during the cryogenic distillation of the air.

DETAILED DESCRIPTION OF THE INVENTION

The invention is useful for removing low levels of carbon dioxide from nonpolar gases. If water vapor and hydrocarbon impurities are present in the nonpolar gas being treated, these impurities will also be removed from the gas as it passes through the zeolite adsorbent(s). The process of the invention is particularly effective for removing carbon dioxide, water vapor and hydrocarbons from air to produce high purity air. The term "high purity air" is used herein to describe air that is substantially carbon dioxide-free, substantially water vapor-free and substantially hydrocarbon-free, i.e. air that contains less than 1 ppm (part per million) each of water vapor and carbon dioxide. It is highly desirable that air feed to cryogenic air distillation plants be high purity air, and most preferred that the air feed contain no more than about 3 ppb (parts per billion) of carbon dioxide.

In accordance with a preferred embodiment of the invention, carbon dioxide that is present in gas streams at low partial pressures, for example up to about 1% by volume, is removed from the gas streams by PSA using only the zeolites listed above or a combination of these adsorbents. As used in this description, the term "zeolite" means porous crystalline aluminosilicate. The term "combination" as used with reference to the selected zeolites includes mixtures and/or intergrowths of two or more of the adsorbents. "Mixtures" includes mixtures of two or more of the various types of zeolites and variations of the same type of zeolite, for instance a mixture of sodium-exchanged faujasite and lithium-exchanged faujasite.

The adsorbents used in the invention have a high capacity for carbon dioxide, water vapor and hydrocarbons and a low capacity for nonpolar gases, such as nitrogen, oxygen, argon, helium and hydrogen. These adsorbents are particularly effective for removing carbon dioxide from nonpolar gas streams when the carbon dioxide is present at up to about 1000 ppm, and even effective when it is present at up to about 1% by volume. Since atmospheric air generally contains up to about 350–400 ppm carbon dioxide, the adsorbents of the invention will efficiently remove carbon dioxide from atmospheric air down to the ppb level.

In the preferred embodiment, the zeolites generally have hydrogen ions or alkali metal ions as predominant exchangeable cations, i.e. ions which compensate the negative charge of the aluminosilicate lattice. "Predominant", in this sense, means that at least 90% of the exchangeable cations are alkali metal or hydrogen cations. The exchangeable cations may be of a single cation species or a mixture of species. The preferred cations are the sodium and potassium ions, and the most preferred cation is the sodium ion. The zeolite often contains up to about 10% residual ions, i.e. ions associated with the zeolite as exchangeable cations other than hydrogen or alkali metal ions. The residual exchangeable ions may be present as a result of the procedure used to manufacture the cation exchanged zeolites of the invention, or they may be intentionally introduced into the zeolites to further modify their properties. Generally, the residual exchangeable ions will be ammonium, calcium, magnesium, strontium, barium, zinc, copper, etc. ions or mixtures of these. The preparation of the adsorbents used in the invention is described in the literature, and thus is not a part of the invention.

The zeolites used in the invention can have a variety of physical forms, and the exact physical form of the product may affect its efficiency in PSA processes. When the zeolites of the present invention are to be used in industrial adsorbers, it may be preferred to aggregate (e.g. pelletize) the zeolite, as pulverulent zeolite may compact in industrial size adsorption columns, thereby blocking, or at least significantly reducing flow through the columns. Those skilled in molecular sieve technology are aware of conventional techniques for aggregating molecular sieves. Such techniques usually involve mixing the molecular sieve with a binder, which is typically a clay, thereby forming aggregates from the mixture, as by extrusion or bead formation, and then heating the formed aggregate to a temperature in the range of about 550 to about 700° C. to convert the green aggregate into a form which is resistant to crushing. The binders used to aggregate the zeolites may include clays, silicas, aluminas, metal oxides and mixtures thereof. In addition, the zeolites may be aggregated using materials such as silica-alumina, silica-magnesia, silica-zirconia, silica-thoria, silica-beryllia, and silica-titania, as well as ternary compositions, such as silica-alumina-thoria, silica-alumina-zirconia and clays present as binders. The relative proportions of the zeolite and binder material may vary widely. Where the zeolite is to be formed into aggregates prior to use, such aggregates are desirably about 0.5 to about 5 mm in diameter.

The temperature at which the adsorption step of the adsorption process is carried out depends upon a number of factors, such as the particular gases being separated, the particular adsorbent being used, and the pressure at which the adsorption is carried out. In general, the minimum adsorption temperature will not be below about 0° C. and the maximum adsorption temperature will not exceed about 100° C. It is usually preferred that the adsorption temperature not exceed about 50° C. The minimum pressure at which the adsorption step is carried out is generally about 0.9 bara, and the maximum adsorption pressure is generally about 50 bara.

During the adsorbent regeneration step, the pressure is generally reduced to about 1 bara or lower, for example, it can be reduced to as low as about 0.1 bara, but is usually not reduced to lower than about 0.2 bara, since the small improvement obtained by further reducing the pressure will usually not justify the increased energy cost required to reach the lower pressure levels. During adsorbent regeneration, the temperature typically is as low as 0° C. and is generally not higher than about 100° C.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

Atmospheric air was purified in a laboratory-scale pressure swing adsorption system consisting of a vertical cylindrical stainless steel vessel 91 inches long and having an internal diameter of 2.15 inches. The vessel was packed with commercial grade NaY zeolite having a silicon/aluminum atomic ratio of 2.5 (sold as 1/16" pellets by UOP under the trademark Molsiv® adsorbent). The PSA cycle included as steps: pressurization to 5 bara, 5 min.; adsorption at 5 bara, 24 min.; depressurization to 1 bara, 1 min.; and purge regeneration at 1.3 bara, 18 min. The gas flow rates during the adsorption and purge regeneration steps were 110 l/min., and 85 l/min., respectively. The pressurization step was carried out by charging carbon dioxide-free and water vapor-free nitrogen into the adsorption vessel. During the adsorption step compressed air saturated with water vapor and containing 350–400 ppm carbon dioxide was passed upwardly through the adsorption vessel at about 25° C. Purge regeneration was carried out by passing water vapor-free and carbon dioxide-free nitrogen through the adsorption vessel at about 25° C. During the process the carbon dioxide and water vapor content at various levels of the adsorption vessel were measured using a carbon dioxide analyzer (Horiba, model GA-360) and a moisture analyzer (Panametrics, Series 3), respectively.

The above-described PSA cycle was repeated continuously more than 1000 times. It was found that both $CO_2$ and water vapor concentration in the purified air streams from bed heights of 51.5 inches and above were below the carbon dioxide and water vapor detection limits.

The adsorbent specific product (calculated using the equation: feed flow rate×feed time/adsorbent weight needed to produce air containing not more than about 3 ppb carbon dioxide) was about 30 scf/lb of NaY adsorbent. The specific product required to reach 3 ppb carbon dioxide in air purification using activated alumina as the adsorbent was about 3.8 scf/lb of alumina.

The high specific product obtained using NaY zeolite as adsorbent indicates that using NaY zeolite for air purification by PSA will greatly reduce the adsorption vessel size necessary to produce high purity air.

Although the invention has been described with particular reference to specific examples, these features are merely exemplary of the invention and variations are contemplated. For instance, the adsorption cycle can include equalization and product backfill steps, and combinations of the specified adsorbents can be used in a single layer or in multiple layers. Also, layers of additional adsorbents and chemical reactants can be used in combination with the zeolite layer when it is desired to remove other impurities from the gas. The scope of the invention is limited only by the breadth of the appended claims.

What is claimed is:

1. A method of removing carbon dioxide from air containing up to about 1000 ppm carbon dioxide by a pressure swing adsorption process having an adsorption step and an adsorbent regeneration step, the adsorption step of which comprises passing said gas through an adsorption zone containing an adsorbent comprising a layer of a zeolite selected from the group consisting of type Y zeolite, ferrierite, type EMT zeolite, beta, ZSM-5, ZSM-11, ZSM-12, ZSM-57, NU-87 and combinations of these, said zeolite having a silicon/aluminum atomic ratio in the range of about 1.5 to about 70, thereby producing a substantially carbon dioxide-free gas stream.

2. The method of claim 1, wherein said silicon/aluminum atomic ratio is in the range of about 1.6 to about 50.

3. The method of claim 1, wherein said gas additionally contains water vapor and said water vapor is removed from said gas during said adsorption step, thereby producing a substantially water vapor- and carbon dioxide-free gas stream.

4. The method of claim 3, wherein said adsorption zone contains only one layer of adsorbent.

5. The method of claim 3, wherein said substantially carbon dioxide-free gas stream is subjected to cryogenic distillation.

6. The method of claim 5, wherein said adsorbent is purged with a waste stream produced during said cryogenic distillation during at least part of said adsorbent regeneration step.

7. The method of claim 1 or claim 3, wherein said zeolite has as exchangeable cations hydrogen ions, lithium ions, sodium ions, potassium ions or mixtures of these.

8. The method of claim 7, wherein said zeolite has sodium ions as the predominant exchangeable cation.

9. The method of claim 8, wherein said zeolite is sodium Y zeolite.

10. The method of claim 7, wherein said silicon/aluminum atomic ratio is in the range of about 1.6 to about 10.

11. The method of claim 1 or claim 3, wherein said zeolite is ZSM-5, ZSM-11, ZSM-12, ferrierite, beta, NU-87 or combinations of these.

12. The method of claim 11, wherein said silicon/aluminum atomic ratio is in the range of about 15 to about 40.

13. The method of claim 1 or claim 3, wherein said adsorption step is carried out at a temperature in the range of about 0 to about 50° C.

14. The method of claim 13, wherein said adsorption step is carried out at a pressure in the range of about 0.9 to about 50 bara.

15. The method of claim 13, wherein said adsorbent regeneration step is carried out a pressure in the range of about 0.1 to about 2 bara.

16. The method of claim 1 or claim 3, wherein said adsorbent regeneration step is carried out at a temperature in the range of about 0 to about 100° C.

17. The method of claim 1 or claim 3, wherein said adsorbent is purged with a substantially water vapor- and carbon dioxide-free gas during at least part of said adsorbent regeneration step.

* * * * *